United States Patent Office 3,268,391
Patented August 23, 1966

3,268,391
2,2'-DIHALODIVINYL SULFONE MICROBIOCIDE
Don R. Baker, Pinole, Calif., Silvio L. Giolito, Whitestone, N.Y., and Duane R. Arneklev, Sunnyvale, Calif., assignors to Stauffer Chemical Company, New York, N.Y., a corporation of Delaware
No Drawing. Filed Sept. 3, 1964, Ser. No. 394,349
2 Claims. (Cl. 167—22)

This invention relates to certain unsaturated sulfones and their utility as microbiocides. More specifically, this invention relates to a method of controlling fungi employing compounds of the following structure:

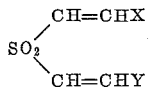

wherein X and Y are selected from the group consisting of H and halogen.

The compounds divinyl sulfone and 2,2'-dichlorodivinyl sulfone are known compounds and appear throughout the literature. However, the utility herein contemplated is new and novel for vinyl sulfone and halovinyl sulfones.

It has now been found that the two compounds specifically mentioned above are particularly effective as microbiocides against fungi in vitro.

Various tests of the compounds have been conducted as described in the following non-limiting examples.

*Microbiocide in vitro test.*—The compounds were tested against growing fungi and bacteria in an artificial medium. Fungi and bacteria were tested in vitro starting with four 1-ounce vials partially filled, two (2) with malt broth and two (2) with nutrient broth. The compound to be tested was placed in the vials at desired concentrations (expressed in parts per million (p.p.m.)) and mixed wtih the broth. The vials were inoculated with a water suspension of spores of the desired fungi, *Aspergillis niger*, Penicillium sp., and cells of the test bacteria *Escherichia coli* and *Staphylococcus aureus* (one organism per vial). The bottles were then sealed and held for one week, after which time the results were observed and noted. Table I contains the data obtained in this manner.

TABLE I.—IN VITRO VIAL TEST

| Organism | Aspergillus niger | Penicillium sp. | Escherichia coli | Staphylococcus aureus |
|---|---|---|---|---|
| Divinyl sulfone | (5) | 10 | 50 | |
| 2,2'-dichlorodivinyl sulfone | *5 | *5 | 50 | 50 |

( )=partial control.
*=lowest rate tested.

As can be seen in the foregoing examples the compounds of the present invention find utility as microbiocides. Whereas activity may vary with the compounds in the range tested, it is to be understood that several factors contribute to the effect noted. Such factors as, time of application, method of application, weather conditions and the like will govern the rate and effect of the application. It is therefore contemplated that depending on conditions, more or less of the active compound may be used as needed to effect control.

The active compositions may be applied in the form of solutions, emulsions, dusts or aerosols, according to procedures well-known in the art. Aqueous as well as non-aqueous solutions are equally suitable. Dust may be prepared directly at required strength using well-known absorbent clays or talcs, or they may be prepared as concentrates which may then be diluted with inert diluents for application.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A method of inhibiting the growth of bacteria and fungi, comprising applying thereto an effective amount of a compound corresponding to the structure

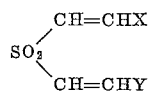

wherein X and Y are halogen.
2. The method of inhibiting the growth of bacteria and fungi, comprising applying thereto an effective amount of the compound 2,2'-dichlorodivinyl sulfone.

References Cited by the Examiner
UNITED STATES PATENTS

| 3,138,519 | 6/1964 | Riden | 167—22 |
| 3,144,383 | 8/1964 | Aichenegg | 167—22 |
| 3,156,606 | 11/1964 | Flay | 167—22 |

JULIAN S. LEVITT, *Primary Examiner.*
JEROME D. GOLDBERG, *Assistant Examiner.*